United States Patent [19]

Alard et al.

[11] Patent Number: 4,565,445

[45] Date of Patent: Jan. 21, 1986

[54] PROCESS AND APPARATUS FOR MEASURING THE EFFECTIVE DIAMETER OF THE GUIDED MODE IN A MONOMODE OPTICAL FIBRE

[76] Inventors: Francis Alard, "Christ" en Ploumilliau, La Rose des Vents, 22300 Lannion; Luc B. Jeunhomme, 9 Square Monge, 78330 Fontenay le Fleury, both of France

[21] Appl. No.: 433,694

[22] Filed: Oct. 12, 1982

[30] Foreign Application Priority Data

Oct. 12, 1981 [FR] France .................... 81 19162

[51] Int. Cl.$^4$ ............................ G01N 21/84
[52] U.S. Cl. ............................ 356/73.1
[58] Field of Search ..................... 356/73.1

[56] References Cited

FOREIGN PATENT DOCUMENTS 5469648  6/1977  Japan ................. 356/73.1
54-35759  3/1979  Japan ................. 356/73.1

OTHER PUBLICATIONS

"Fiber Optics", N. S. Kapan, pp. 160-163.

Review of Scientific Instruments, vol. 53, No. 2, Feb. 1982.
Alard et al., "Fundamental Mode Spot-Size Measurement in Single-Mode Optical Fibres", Electronics Letters, Dec. 10, 1981, vol. 17, #25, pp. 958-960.

*Primary Examiner*—Vincent P. McGraw
*Attorney, Agent, or Firm*—Oblon, Fisher, Spivak, McClelland & Maier

[57] ABSTRACT

A process and apparatus for measuring the effective diameter of the guided mode of a monomode optical fibre. The apparatus utilizes a lighting source such as a tungsten filament or a quartz-halogen lamp in conjunction with a monochromator for selecting light of wavelength $\gamma$ from the lamp, as well as a variable aperture lens. The imaging of the source is performed on the input face of the fibre by means of the lens with the image having a size greater than the diameter of the fibre core. The light from the source falls on the fibre in accordance with a cone having an apex halfangle $\phi$. The lighting power $P(\phi)$ transmitted by the fibre as measured as a function of $(\phi)$ and the effective diameter $2w_0$ is determined in accordance with a disclosed formula.

7 Claims, 3 Drawing Figures

PROCESS AND APPARATUS FOR MEASURING THE EFFECTIVE DIAMETER OF THE GUIDED MODE IN A MONOMODE OPTICAL FIBRE

BACKGROUND OF THE INVENTION

The present invention relates to a process and an apparatus for measuring the effective diameter of the guided mode in a monomode optical fibre. It more particularly applies to the determination of the characteristics of the monomode optical fibres and therefore to optical telecommunications.

It is known that the effective diameter, designated $2w_o$, governs the losses resulting from microcurvatures and connections in the case of monomode optical fibres and that the knowledge of this effective diameter as a function of the wavelength makes it possible, for a monomode optical fibre, to determine the diameter of the core and the difference in the optical indices of the step fibre (or jump) with an equivalent index and consequently the losses by curvature and the pass band of said monomode fibre.

Methods for measuring the index profile or radiation pattern in the remote field are known, which make it possible to calculate the parameters of the step fibre with an index equivalent to the monomode optical fibre and from this it is possible to deduce the effective diameter $2w_o$ of the latter.

However, the index profile measuring methods are very difficult to perform, due to the very small diameter of the core of a monomode optical fibre which is generally less than 10 μm. Moreover, the parameters of the equivalent fibre are then obtained indirectly by calculations and the value of the effective diameter $2w_o$, itself obtained by a further and not very accurate calculation.

The methods for measuring the radiation pattern in the remote field require very bright lighting sources, because they involve the measurement of secondary lobes, which have a very low relative intensity. The sources which can be used are lasers of the krypton, argon, helium-neon or YAG-Nd$^{3+}$ types, so that the studied fibre must be of the monomode type at their emission wavelength, which varies from 0.5 to 0.8 μm for the first three types and 1.06 μm for the last type, which is not necessarily the case.

The aforementioned methods only permit an indirect determination of the effective diameter $2w_o$. A method for the direct measurement of the latter is given in an article by C. A. MILLAR, published in Electronics Letters, vol. 17, no. 13, June 1981, pp. 458–460. However, this method necessitates a special measuring bench for its performance, which imposes a supplementary manipulation of the studied fibre compared with the other measurements which it is desired to carry out thereon. This also applies with regards to the other aforementioned indirect determination methods.

BRIEF SUMMARY OF THE INVENTION

The present invention relates to a process and to an apparatus for measuring the effective diameter of the guided mode in a monomode optical fibre, which do not have the disadvantages of the methods referred to hereinbefore, particularly in that they make it possible to directly measure the said effective diameter and carry out the measurement thereof on an arrangement identical to that used for attenuation measurements, thus avoiding a long, costly, additional manipulation of the investigated fibre.

More specifically the present invention relates to a process for measuring the effective diameter $2w_o$ of the guided mode in a monomode optical fibre, at a wavelength λ, said optical fibre admitting an input face, wherein it comprises directing on to said input face a beam of incoherent light of wavelength λ, incident on said input face in accordance with a cone of apex semiangle φ, said beam having a cross-section on the input face, which is greater than that of the core of the optical fibre, having an intensity which has a symmetry of revolution about the axis of said cone and being such that the lighting power transferred by this beam in an infinitely small solid angle $d\Omega$ about a direction forming an angle $\theta$ with said axis is proportional to $\cos\theta d\Omega$, the optical fibre being disposed in accordance with said axis; measuring the lighting power $P(\phi)$ transmitted by the optical fibre, as a function of the apex semiangle φ; and determining the effective diameter $2w_o$ with the aid of the following formula, in which $P_\infty$ is a quantity independent of the apex semiangle φ:

$$P(\phi) = P_\infty[1 - \exp(-2(\pi^2 w_o^2/\lambda^2)\sin^2\phi)]$$

According to a special feature of the process according to the invention the lighting beam is obtained with the aid of an incoherent radiation source of wavelength λ, whose image is formed on said input face as a result of optical means, the image of the source having a size greater than the diameter of the optical fibre core, said source admitting a radiation pattern having a symmetry of revolution about an axis forming the axis of said cone and being such that the lighting power emitted by it in an infinitely small solid angle $\Omega_s$ about a direction forming an angle $\theta_s$ with said axis is proportional to $\cos\theta_s d\Omega_s$, said optical means retaining the angular law of the radiation and making it possible to vary the apex semiangle φ.

According to another special feature, the source comprises a quartz-halogen lamp with a tungsten filament, provided with wavelength selection means, so as to obtain the radiation of wavelength λ.

According to a special feature, the optical means comprise a lens or objective with a variable aperture. It is then possible to vary the apex semiangle φ with the aid of said variable aperture in such a way as to obtain several pairs $(\phi, P(\phi))$, and, by means of said pairs and said formula, it is possible to determine the effective diameter $2w_o$ by the method of least squares.

According to another special feature, the size of the image of the source is at least five times greater than the diameter of the optical fibre core.

The invention also relates to an apparatus for measuring the effective diameter $2w_o$ of the guided mode in a monomode optical fibre, at a wavelength λ, wherein it comprises, in order, said source, said optical means and said means for measuring the lighting power $P(\phi)$ transmitted by the optical fibre the latter being positioned between the optical means and measuring means.

The invention makes it possible to determine the effective diameter $2w_o$ of the guided mode at different wavelengths, by performing a measurement of $w_o$ at each of these wavelengths. As indicated hereinafter, it is then possible to determine the core diameter and the difference of the optical indices of the fibre at an equivalent index jump. Any wavelength at which an effective diameter measurement takes place must obviously be greater than the cutoff wavelength of the second mode.

BRIEF DESCRIPTION OF THE DRAWINGS

The invention is described in greater detail hereinafter relative to non-limitative embodiments and with reference to the attached drawings, wherein show.

DETAILED DESCRIPTION OF THE PREFERRED EMBODIMENTS

Figure 1:
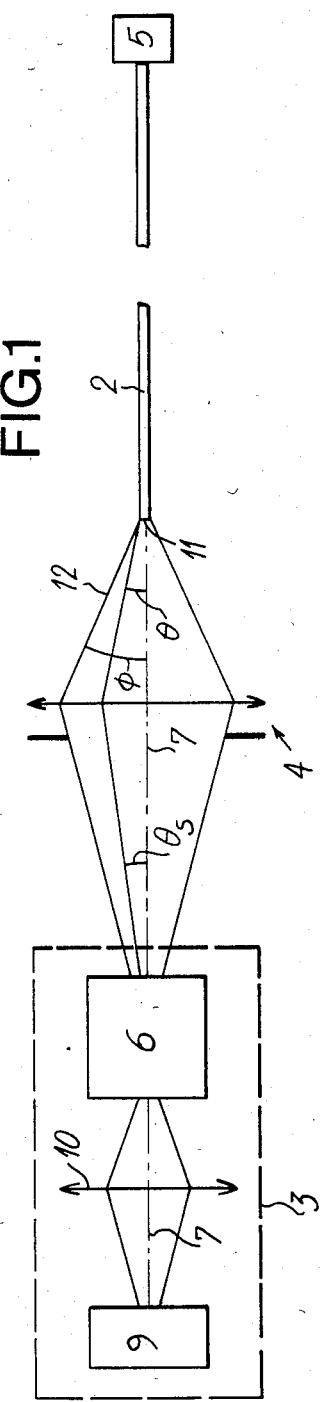
FIG. 1 a diagrammatic view of an embodiment of an apparatus for performing the process according to the invention.

FIG. 1 diagrammatically shows an embodiment of the apparatus according to the invention for determining the effective diameter $2w_o$ of the guided mode in a monomode optical fibre 2, and a wavelength $\lambda$. This apparatus essentially comprises a source 3 of incoherent radiation of wavelength $\lambda$, optical means 4 and lighting power measuring means 5.

Figure 2:
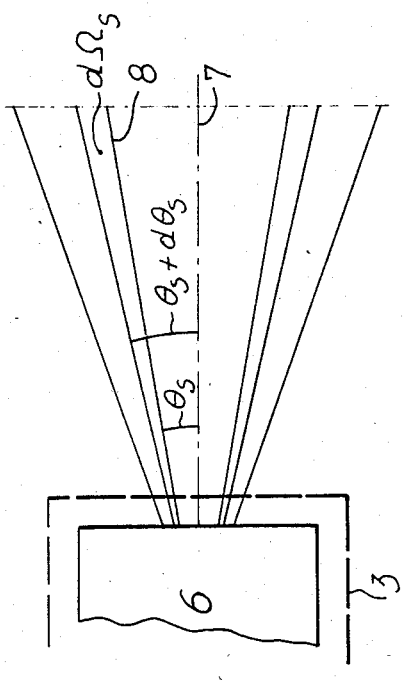
FIG. 2 a diagrammatic view of a light beam emitted by a light source used in the apparatus of FIG. 1.

If the source 3 emits radiation with a spectral width greater than 5% of the central emission wavelength, it is preferable to add thereto wavelength selection means 6, so as to obtain the radiation with the desired wavelength $\lambda$. Moreover, source 3 is intended to have a radiation pattern with a symmetry of revolution about an axis 7 and this source is also provided so that the lighting power emitted by it in an infinitely small solid angle $d\Omega_s$ (FIG. 2) about a direction 8 forming an angle $\theta_s$ with said axis 7 is proportional to $\cos\theta_s d\Omega_s$ for any angle $\theta_s$ at the most equal to an angle $\theta_o$, itself at the most equal to 90°.

It is therefore possible to realize source 3 with the aid of a tungsten filament quartz-halogen lamp 9 associated with the selection means 6, which can consist of a monochromator (or wavelength filter). Lamp 9 supplies the light which it emits to monochromator 6 via an optical means 10. The axis 7 of revolution is normal to the emitting surface of lamp 9. For example monochromator 6 has an aperture of approximately f/3 to f/4.

The optical means 4 form the image of source 3 on input face 11 of optical fibre 2 and are chosen so as to retain the angular law of radiation of source 3, to within a factor K, i.e. to transform an incident light ray under an angle $\theta_s$ with respect to axis 7 and to a light ray forming an angle $\theta = K\theta_s$ with respect to said axis 7. The optical means 4 are also chosen so as to make it possible to vary, within values $\phi$ and $\theta_M$, the apex semiangle $\phi$ of a cone of revolution 12 having as its axis axis 7 and formed by said radiation, when its strikes the input face 11 of optical fibre 2, $\theta_M$ being at the most equal to $K\theta_o$.

The optical means 4 comprise, for example, a variable aperture lens, said aperture being variable e.g. between f/1 and f/22. The variations of the aperture lead to variations of the apex semiangle $\phi$. Lens 4 is e.g. of the type used in photographic equipment or cameras. Factor K is the magnification factor of lens 4.

Optical fibre 2 is arranged along axis of revolution 7 and is positioned between lens 4 and the measuring means 5 for measuring the lighting power $P(\phi)$ transmitted by optical fibre 2, when the latter is illuminated by source 3. The measuring means 5 e.g. comprise a cooled germanium detector or a photodiode.

Source 3 and lens 4 are arranged in such a way that the image of source 3 on input face 11 of optical fibre 2 has a much larger size (e.g. five times) than the diameter of the core 13 of optical fibre 2 (FIG. 3) or, in other words, in such a way that the light beam from source 3 and striking the input face 11 of optical fibre 2 has a cross-section A, on the input face 11, which is much greater than that of core 13.

The hypotheses made hereinbefore in connection with the radiation pattern and emitted lighting power of source 3 result from identical properties of the quartz-halogen lamp 9 and also imply identical properties for the light beam striking input face 11 of optical fibre 2, as a result of the properties of optical means 4 referred to hereinbefore. The intensity of the beam has an axial revolution of symmetry, said axis 7 (axis of cone 12 of apex semiangle $\phi$) and said beam being such that the lighting power which it transfers in the infinitely small solid angle $d\Omega$ (FIG. 3) about a direction 14 forming an angle $\theta$ with axis 7 is proportional to $\cos\theta d\Omega$.

Figure 3:
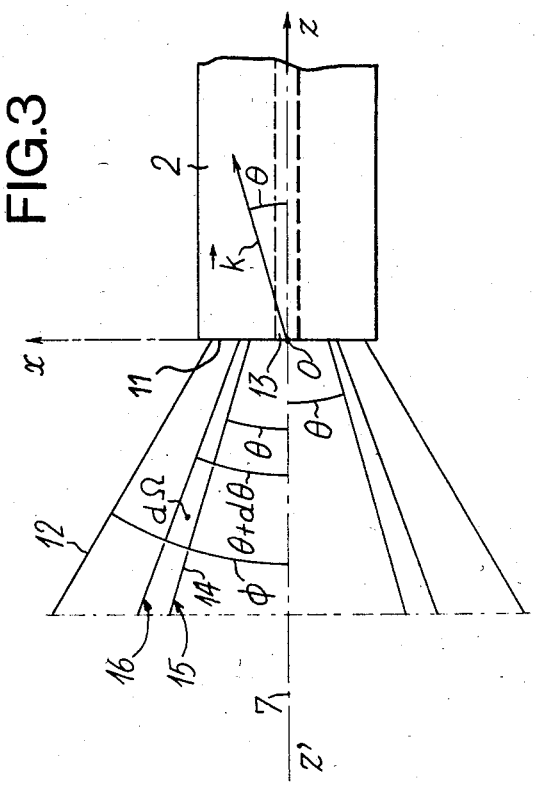
FIG. 3 a diagrammatic view of an incident light beam on a monomode optical fibre, which it is desired to study by means of the apparatus of FIG. 1.

FIG. 3 shows what is meant by solid angle $d\Omega$. It is a solid angle corresponding to the volume between two cones of revolution 15, 16, whose axis is axis 7, and having respective axis semiangles $\theta$ and $\theta + d\theta$. The solid angle $d\Omega_s$ (FIG. 2) is defined in the same way.

According to the process of the invention, once the measurement wavelength $\lambda$ has been chosen, the lighting power $P(\phi)$ transmitted by optical fibre 2 as a function of the apex semiangle $\phi$ is measured and the effective diameter $2w_o$ is determined by means of the following formula, in which $P_\infty$ is a quantity independent of the apex semiangle $\phi$:

$$P(\phi) = P_\infty [1 - \exp(-2(\pi^2 w_o^2/\lambda^2) \sin^2 \phi)] \qquad (1)$$

By measuring the lighting power $P(\phi)$ for different values of $\phi$, obtained by changing the aperture of lens 4, it is possible to calculate the effective diameter $2w_o$ at wavelength $\lambda$, e.g. using the method of least squares applied to formula (1).

Using the apparatus according to the invention, of which a special embodiment has been described, it is possible to carry out a spectral attenuation measurement of optical fibre 2, with a fixed aperture of lens 4 (e.g. the largest of the attainable apertures), then, without it being necessary to remanipulate optical fibre 2, which constitutes an advantage compared with the prior art, it is possible to raise the lighting power $P(\phi)$ for different values of $\phi$ and for each desired wavelength $\lambda$, so as to be able to determine the effective diameter $2w_o$ corresponding to these wavelengths.

Formula (1) can be established in the following way. The axis of optical fibre 2 is designated $z'z$ (FIG. 3), said axis also coinciding with the axis of revolution 7. Axis $z'z$ meets input face 11 of optical fibre 2 at point 0. Two perpendicular axes Ox and Oy (Oy not being shown) are defined in the plane of input face 11.

An incident plane wave on the input face 11 and of wave vector $\vec{k}$ in plane xOz and inclined by an angle $\theta$ with respect to axis $z'z$ has for its normalized amplitude on input face $$E_\theta(x) = A^{-\frac{1}{2}} \exp(-ikx \sin\theta)$$

in which A is the cross-sectional area of the incident beam on input face 11, k being equal to $2\pi/\lambda$.

The amplitude of the guided fundamental mode in optical fibre 2, on the input face, can be represented by a gaussian function of form $\exp(-r^2/w_o^2)$, $w_o$ being the radius at $e^{-2}$ in relative intensity of the gaussian wave, which supplies the best excitation efficiency of the guided mode and r being equal to $(x^2+y^2)^{\frac{1}{2}}$.

The excitation efficiency $\rho_i(\theta)$ of the fundamental mode by the preceding incident plane wave is equal to $|\hat{\rho}_i(\theta)|^2$ with:

$$\hat{\rho}_i(\theta) = w_o^{-1} 2^{\frac{1}{2}} (\pi A)^{-\frac{1}{2}} \int\int \exp(-r^2/w_o^2) \exp(-ikx \sin\theta) dx dy$$

in which $w_o^{-1} 2^{\frac{1}{2}} (\pi A)^{-\frac{1}{2}}$ is a normalization factor. As the plane wave is much more extensive than the mode, area A is much greater than $w_o^2$ and integration takes place on the complete plane xOy whilst taking account of the fact that $r^2$ can be written $x^2+y^2$:

$$\hat{\rho}_i(\theta) = w_o^{-1} 2^{\frac{1}{2}} (\pi A)^{-\frac{1}{2}} \int_{-\infty}^{+\infty} \exp(-y^2/w_o^2) dy \int_{-\infty}^{+\infty} \exp(-x^2/w_o^2 - ikx \sin\theta) dx$$

By setting $\sin u = 2(kw_o)^{-1} = \lambda(\pi w_o)^{-1}$, we obtain $$\hat{\rho}_i(\theta) = w_o (2\pi/A)^{\frac{1}{2}} \exp(-\sin^2\theta/\sin^2 u)$$

so that $$\rho_i(\theta) = |\hat{\rho}_i(\theta)|^2 = 2\pi w_o^2/A \exp(-2\sin^2\theta/\sin^2 u)$$

This efficiency $\rho_i(\theta)$ is also that which corresponds to a random plane wave, incident on face 11, and whose wave vector has the modulus k and which is inclined by an angle $\theta$ with respect to axis z'z, as a result of the properties of the incident beam referred to hereinafter.

Power $P(\phi)$ corresponds to an overall excitation of the optical fibre by the incoherent light beam uniformly illuminating the surface A and which is much greater than $\pi w_o^2$, said beam having an intensity with a symmetry of revolution about axis 7 and being such that the lighting power dP transferred by the beam in a solid angle $d\Omega$ about a direction forming an angle $\theta$ with axis 7 ($\theta \leq \theta \leq \phi$) is equal to $P_o \cos\theta d\Omega$ in which $P_o$ is a proportionality factor. Thus, this power $P(\phi)$ is equal to $$P(\phi) = \int_0^\phi \rho_i(\theta) dP = \int_0^\phi \rho_i(\theta) P_o \cos\theta \, d\Omega$$

$$= P_o \int_0^\phi 2\pi \rho_i(\theta) \sin\theta \cos\theta \, d\theta$$

$$= P_o \lambda^2/A \, [1 - \exp(-2\sin^2\phi/\sin^2 u)]$$

which indeed gives formula (1), by setting $P_\infty = P_o \lambda^2/A$ and by replacing $\sin u$ by its value $\lambda(\pi w_o)^{-1}$.

What is claimed is:

1. A process for measuring the effective diameter $2w_o$ of the guided mode in a monomode optical fibre, at a wavelength $\lambda$, said optical fibre admitting an input face, wherein said process comprises the steps of;

directing onto said input face a beam of incoherent light of wavelength $\lambda$, incident on said input face in accordance with a cone of apex semiangle $\phi$, through optical means making it possible to vary the apex semiangle $\phi$, said beam having a cross-section on the input face, which is greater than that of the core of the optical fibre, having an intensity which has a symmetry of revolution about the axis of said cone and being such that the lighting power transferred by this beam in an infinitely small solid angle $d\Omega$ about a direction forming an angle $\theta$ with said axis is proportional to $\cos\theta d\Omega$, the optical fibre being disposed in accordance with said axis;

carrying out a plurality of measurements of the lighting power $P(\phi)$ transmitted by the optical fibre, each measurement being carried out with a different value for the apex semiangle $\phi$ determined by the optical means; and determining the effective diameter $2w_o$ with the aid of said measurements and by the use of the following formula, in which $P_\infty$ is a quantity independent of the apex semiangle $\phi$:

$$P(\phi) = P_\infty [1 - \exp(-2(\pi^2 w_o^2/\lambda^2) \sin^2\phi)].$$

2. A process according to claim 1, wherein the lighting beam is obtained with the aid of an incoherent radiation source of wavelength $\lambda$, whose image is formed on said input face as a result of said optical means, the image of the source having a size greater than the diameter of the optical fibre core, said source admitting a radiation pattern having a symmetry of revolution about an axis forming the axis of said cone and being such that the lighting power emitted by said source in an infinitely small solid angle $d\Omega_s$ about a direction forming an angle $\theta_s$ with said axis is proportional to $\cos\theta_s d\Omega_s$, said optical means retaining the angular law of the radiation.

3. A process according to claim 2, wherein the source comprises a tungsten filament quartz-halogen lamp, provided with wavelength selection means, so as to obtain the radiation of wavelength $\lambda$.

4. A process according to claim 2, wherein the optical means comprise a lens having a variable aperture.

5. A process according to claim 4, wherein the apex halfangle $\phi$ is varied by means of the variable aperture, so as to obtain several pairs ($\phi$, $P(\phi)$), and wherein, by means of these pairs and said formula, the effective diameter $2w_o$ is determined by the method of least squares.

6. A process according to claim 2, wherein the size of the image of the source is at least five times greater than the diameter of the optical fibre core.

7. An apparatus for measuring the effective diameter $2w_o$ of the guided mode in a monomode optical fibre, at a wavelength $\lambda$, said apparatus comprising, in succession, a source of incoherent radiation of wavelength $\lambda$ which outputs a lighting beam, an optical means for forming an image of said beam on an input face of said optical fibre wherein said beam is incident on said input face in accordance with a cone of apex semiangle $\phi$ wherein said optical means makes it possible to vary said apex semiangle and wherein said beam has a cross-section on the input face which is greater than that of the core of the optical fibre and wherein said beam has an intensity which has a symmetry of revolution about the axis of said cone and is such that the lighting power transferred by this said beam in an infinitely small solid angle $d\Omega$ about a direction forming an angle $\phi$ with said axis is proportional to $\cos\theta d\Omega$, means for measuring the lighting power $P(\phi)$ transmitted by the optical fibre, said optical fibre, being positioned between the optical means and the measuring means.

* * * * *